United States Patent
Tennyson et al.

(10) Patent No.: US 8,820,598 B2
(45) Date of Patent: Sep. 2, 2014

(54) VEHICLE MOUNTED EQUIPMENT CARRIER

(75) Inventors: Ty Tennyson, Cincinnati, OH (US); Michael Henley, Liberty Township, OH (US)

(73) Assignee: Ty Tennyson, Cincinnati, OH (US)

( * ) Notice: Subject to any disclaimer, the term of this patent is extended or adjusted under 35 U.S.C. 154(b) by 321 days.

(21) Appl. No.: 13/474,167

(22) Filed: May 17, 2012

(65) Prior Publication Data

US 2012/0292357 A1    Nov. 22, 2012

Related U.S. Application Data

(60) Provisional application No. 61/487,557, filed on May 18, 2011.

(51) Int. Cl.
*B60R 9/06* (2006.01)

(52) U.S. Cl.
CPC .. *B60R 9/06* (2013.01); *B60R 9/065* (2013.01)
USPC ............ 224/509; 224/519; 224/524; 224/532

(58) Field of Classification Search
CPC .................................. B60R 9/06; B60R 9/065
USPC ......... 224/400, 433, 452, 453, 488, 495, 502, 224/509, 519, 524, 525, 527, 531, 532, 224/42.32, 42.4; 296/37.6; 211/17, 182, 211/188, 194, 90.04, 123, 126.14, 126.9, 211/133.2, 133.3; D12/406, 412, 413
See application file for complete search history.

(56) References Cited

U.S. PATENT DOCUMENTS

| | | | | |
|---|---|---|---|---|
| 2,867,471 A * | 1/1959 | Coon, Jr. | ........................ | 296/156 |
| 2,969,155 A * | 1/1961 | Atkinson | ...................... | 211/189 |
| 3,172,539 A * | 3/1965 | Rulf | .............................. | 211/59.1 |
| 3,311,277 A * | 3/1967 | Gordon | ......................... | 224/431 |
| 3,891,132 A | 6/1975 | Chandler | | |
| 3,896,742 A | 7/1975 | Ferraro | | |
| 4,089,554 A * | 5/1978 | Myers | .......................... | 296/37.1 |
| 4,282,993 A * | 8/1981 | Humlong | ..................... | 224/431 |
| 4,375,306 A | 3/1983 | Linder | | |
| D272,337 S * | 1/1984 | Mondak et al. | ............... | D12/317 |
| 4,518,189 A * | 5/1985 | Belt | ................................ | 296/22 |
| 4,889,377 A * | 12/1989 | Hughes | ............................. | 296/3 |
| 5,029,740 A * | 7/1991 | Cox | ............................... | 224/484 |
| 5,094,373 A * | 3/1992 | Lovci | ............................ | 224/509 |
| 5,215,234 A * | 6/1993 | Pasley | ........................... | 224/508 |
| 5,215,346 A * | 6/1993 | Reitzloff et al. | ................ | 296/51 |
| 5,544,799 A | 8/1996 | Didlake | | |
| 5,586,702 A * | 12/1996 | Sadler | ........................... | 224/521 |
| 5,730,066 A | 3/1998 | Auten et al. | | |

(Continued)

*Primary Examiner* — Justin Larson

(74) *Attorney, Agent, or Firm* — Gifford, Krass, Sprinkle, Anderson & Citkowski, P.C.

(57) ABSTRACT

A rack for retaining a plurality of modular accessory cubes at the rear of a motor vehicle includes a hitch mounted swing-away carrier supporting an upright post carrying a number of planar platforms which the cubes may be attached to. The cubes may have drawers for supporting equipment such as grills and the like useful for outdoor activities and other modules may comprise electronic entertainment equipment such as audio players, radio and TV receivers, and the like. The platforms and the bases of the modules are formed with complementary engaging sections for positioning the modules on the platform, and threaded fasteners projecting upwardly through the platforms may quickly allow the modules to be secured and released from the platforms.

13 Claims, 10 Drawing Sheets

(56) References Cited

U.S. PATENT DOCUMENTS

| | | | |
|---|---|---|---|
| 5,806,736 A * | 9/1998 | Kincart | 224/509 |
| 5,836,494 A * | 11/1998 | Grunsted et al. | 224/521 |
| 5,950,617 A * | 9/1999 | Lorenz | 126/276 |
| 6,189,754 B1 * | 2/2001 | Cutajar et al. | 224/519 |
| 6,189,945 B1 * | 2/2001 | Rockett | 296/37.6 |
| 6,193,124 B1 * | 2/2001 | Brazil et al. | 224/521 |
| 6,386,410 B1 * | 5/2002 | Van Dusen et al. | 224/509 |
| D460,656 S * | 7/2002 | Caulder | D7/332 |
| 6,739,269 B1 | 5/2004 | Benton | |
| 6,814,383 B2 * | 11/2004 | Reed et al. | 296/24.3 |
| 6,863,198 B1 * | 3/2005 | Darby | 224/403 |
| 7,204,538 B2 * | 4/2007 | Warlick et al. | 296/37.1 |
| 7,261,299 B1 | 8/2007 | Chiu | |
| 7,591,404 B2 * | 9/2009 | LeDuc et al. | 224/509 |
| 7,937,954 B2 * | 5/2011 | Kang et al. | 62/3.3 |
| 8,231,036 B2 * | 7/2012 | Campbell et al. | 224/527 |
| 8,646,668 B2 * | 2/2014 | Oakes | 224/401 |
| 2002/0043259 A1 * | 4/2002 | Brennan | 126/41 R |
| 2010/0090053 A1 * | 4/2010 | Stiltner | 242/594.4 |
| 2010/0176170 A1 * | 7/2010 | O'Hare | 224/519 |
| 2012/0286009 A1 * | 11/2012 | Forbis et al. | 224/400 |

\* cited by examiner

VEHICLE MOUNTED EQUIPMENT CARRIER

CROSS-REFERENCE TO RELATED APPLICATIONS

This application claims priority of U.S. Provisional Patent Application 61/487,557 filed May 18, 2011, the contents of which are incorporated herein by reference.

FIELD OF THE INVENTION

This invention relates to equipment carrier systems which may be hitch mounted to the rear of a motor vehicle and include a swing-away arm and a plurality of platforms which support modular accessory cubes, and more particularly to such a system designed to accommodate modules which are useful for outdoor entertainment.

BACKGROUND OF THE INVENTION

Hitch mounts of the type used to releasably mount trailers and the like to the rear of a motor vehicle are well known. A variety of equipment carriers have been produced and proposed which attach to the rear of vehicles through these hitch mounts. Certain of these carriers include swing-away arms which allow equipment to be supported immediately adjacent the rear of the vehicle or at a distance from the vehicle to allow access to the equipment. Typical swing out hitch-mounted carriers are shown in U.S. Pat. Nos. 5,544,799 and 7,261,299, by way of example.

These prior art devices are typically configured to carry a particular type of equipment such as bicycles, wheelchairs, and the like. It would be desirable to provide such a hitch mounted swing-arm carrier which might be used with a wide range of equipment which could be accommodated in containers secured to the carrier.

SUMMARY OF THE INVENTION

The present invention is therefore directed toward a unique form of a hitch mounted, swing away equipment carrier including a novel swing-away mechanism and a plurality of support platforms for retaining a variety of equipment.

The preferred embodiment of the invention, which will subsequently be disclosed in detail, is broadly directed toward such a carrier for equipment useful in engaging in outdoor recreational activities such as tailgate parties, travel to camping sites, and the like. However, it should be appreciated that the structural arrangement would be useful for a wide variety of other equipment carrying situations.

The preferred embodiment of the invention employs a hitch-mounted configuration which employs a first elongated arm having a male hitch member extending from one of its ends at a right angle to the arm so that the arm is normally supported horizontally across the rear end of the motor vehicle. A second, pivotable arm is joined to the opposite end of the first arm through a pivotable joint that extends at a right angle to the first arm and has an extension in an upward direction. The connection is such that the second arm may be swung between a closed position wherein it lies above the first arm, next to the rear of the motor vehicle, and an open position in which its outer end, the one at the opposite end from the pivot, extends away from the rear of the vehicle. A vertically extending third elongated arm is joined to the outer end of the second arm so that it projects upwardly from the second arm.

A first pair of elongated rods are joined to the vertically extending arm at its top end; these rods extend in opposite directions from the third arm and are parallel to the second swinging arm. A second pair of rods is joined to the vertical third arm below these top rods. Each of the rods carries a generally L shaped platform carrier formed by tubing which extends downwardly from the support rods and is then bent at 90 degrees into a horizontally extending section. Thus, in the preferred embodiment there are four of these horizontally extending sections which act as support platforms for modular cubes that may be detachably joined above the platforms. Recesses are formed on the bottoms of each of the modular cubes that are complementary to the tubing sections that form the platforms to position the cubes on the support platforms. A threaded fastener extends upwardly through a central hole in each support panel to engage threaded holes in the bottom of the module cubes to releasably retain the cubes on the platforms.

While the modular cubes all have the same outer dimensions, they may come in a variety of forms. In the preferred embodiment one type of module has a set of drawers which may be used for storage of equipment. Another module is used for an audio reproduction system which may be a DVD player, an MP3 player, or the like and has loudspeakers built into its sides. The speaker module may also carry a radio receiver and/or a TV receiver. A grill module is adapted to fit within a drawer on one of the cubes. Another module is an insulated cooler with a top opening.

BRIEF DESCRIPTION OF THE DRAWINGS

Other objectives, advantages, and objects of the present invention will be made apparent by the following detailed description of a preferred embodiment of the invention. The description makes reference to the accompanying drawings in which:

FIG. 10 is a perspective view of an entertainment module comprising a television and its speakers, which may also be used for audio sources such as MP3 players, audio discs, radios, and the like.

DETAILED DESCRIPTION OF A PREFERRED EMBODIMENT OF THE INVENTION

While the preferred embodiment of the invention as disclosed in the accompanying drawings is exemplary of the invention, variations on the invention, only limited by the scope of the appended claims, are intended to be within the scope of the invention.

Figure 4:
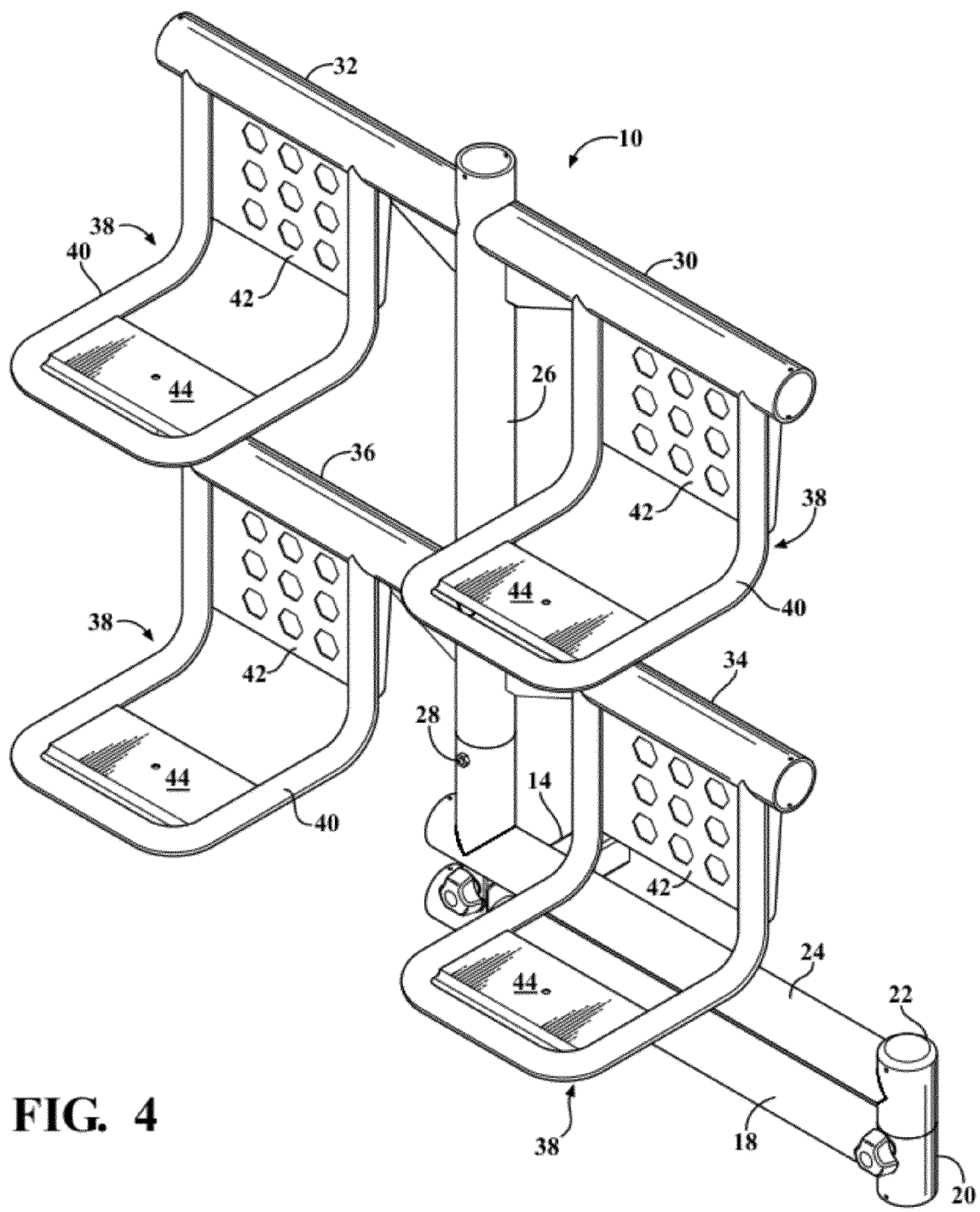
FIG. 4 is a perspective view of the rack without cubes.
Figure 5:
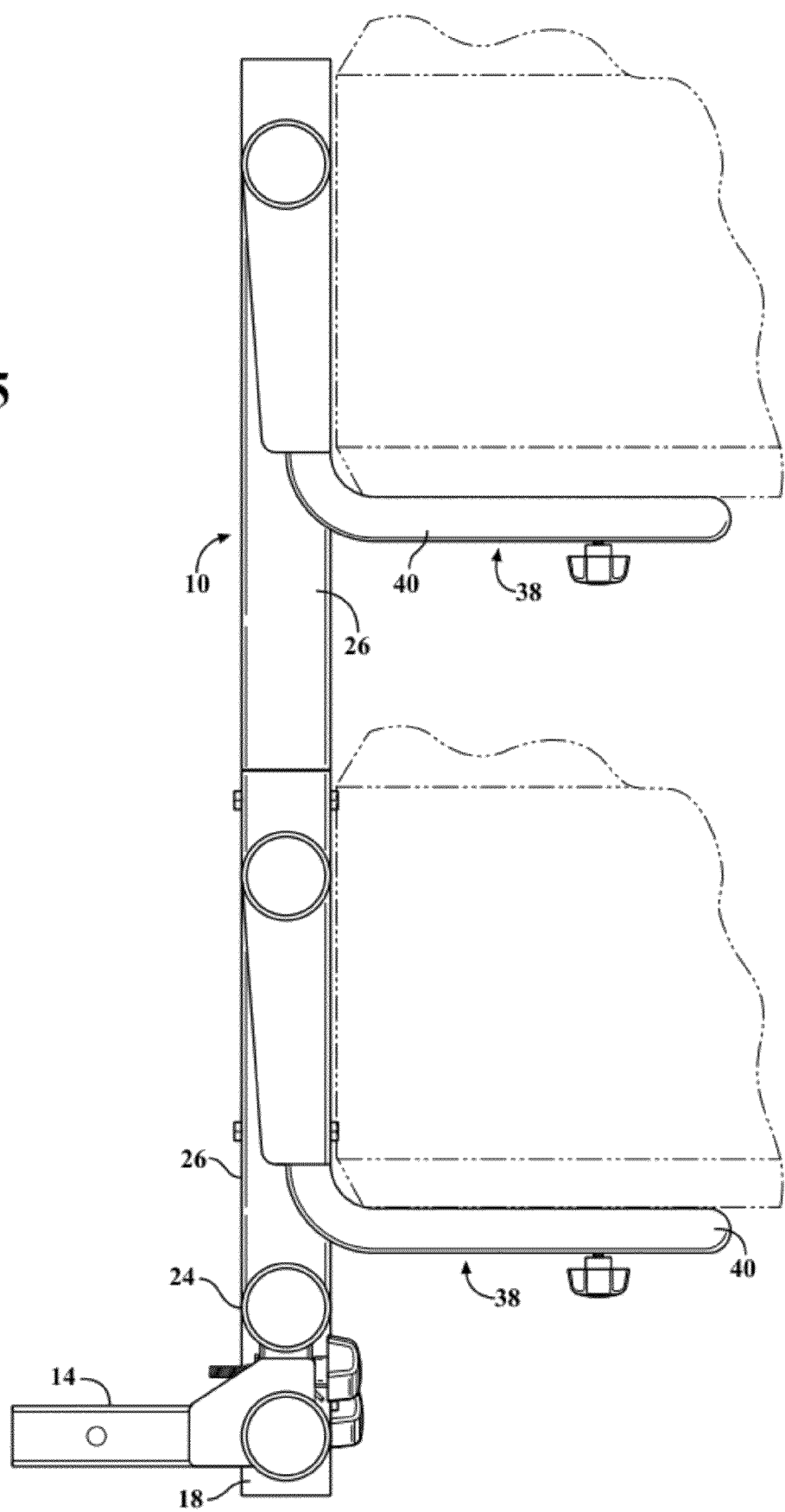
FIG. 5 is a side view of the rack illustrating the modular cubes in phantom.
Figure 6:
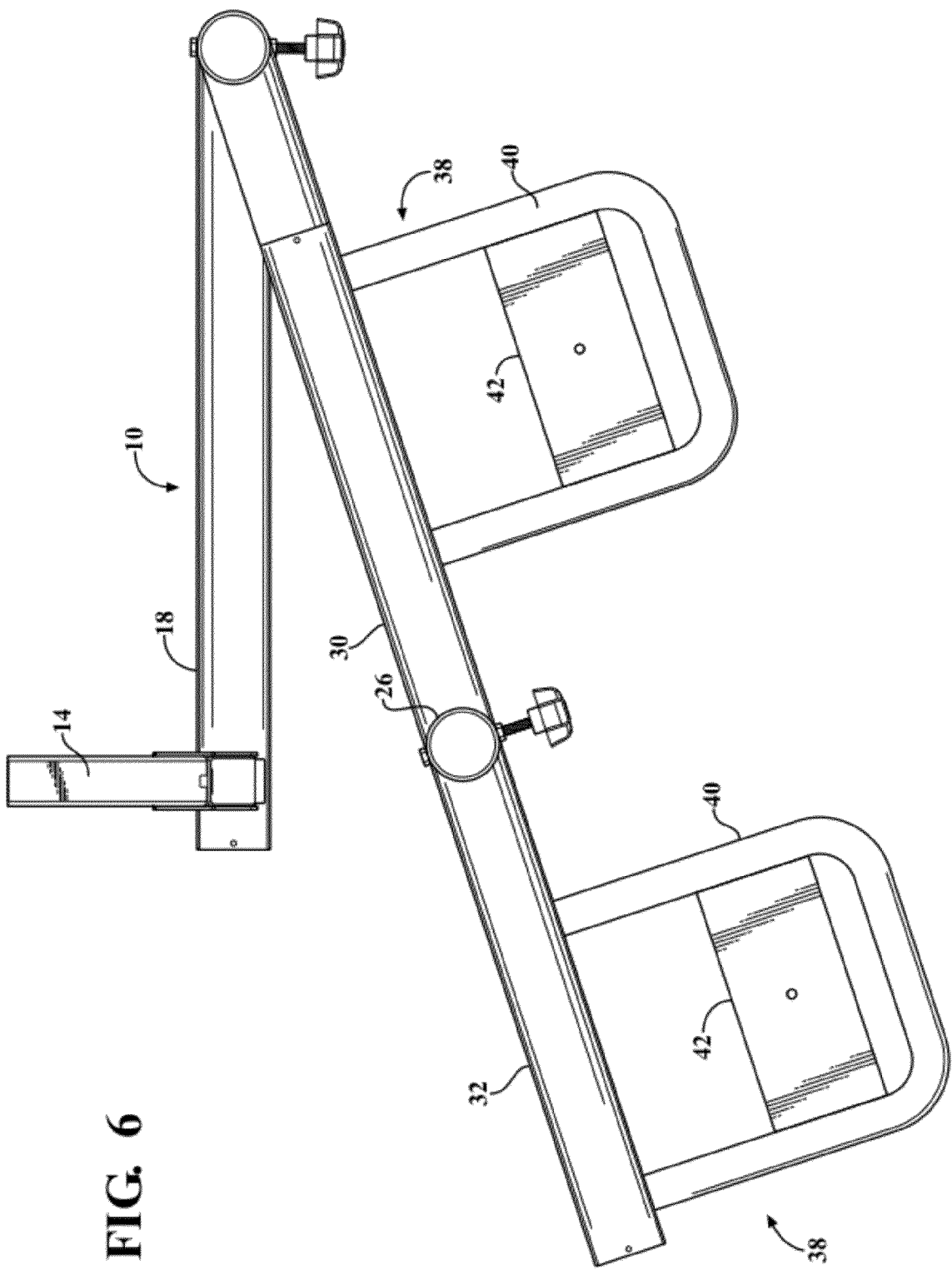
FIG. 6 is a top view of the rack.

As illustrated in the drawings, the rack of the present invention, generally indicated at 10 in FIG. 4, is intended to be attached to an automotive vehicle 12 through a conventional hitch assembly. The male member 14 of the hitch assembly, as illustrated in FIGS. 4-7, mates with a female hitch section (not shown) preferably attached to the frame of the vehicle and extending along the longitudinal axis of the vehicle with its open end extending rearwardly from under the vehicle rear bumper 16. As illustrated in FIGS. 4-7, the male hitch member 14 is connected, by welding or the like, to a tubular elongated arm 18. The connection between the male hitch member and the first arm member 18 is at right angles so that when the male hitch member 14 is inserted into the female hitch attached to the vehicle, the first arm 18 extends horizontally across the rear of the vehicle 12 near the top of the rear bumper 16. The arm terminates short of the end of the bumper.

The far end of the first arm 18 is connected to the side of the bottom member of a pivotable joint 20. The joint 20 has an upward extension 22 and one end of the second arm 24 is joined to the side of the top section 22 of the joint. The location of the connections between the first arm 18 and the second arm 24 on the pivotable joint 20 are such that the second arm extends in a plane above the first arm. At the end of the second arm remote from the pivotable joint 20, a generally vertically extending third elongated arm 26 is joined to the top side of the arm 24. The arm 26 may be formed in two sections at a point along its length, with the two sections being removably secured together by a set screw 28 to allow the upper portion of the rack to be separated from the bottom for storage purposes, travel purposes, or the like.

A pair of elongated rods 30 and 32 are connected to the diametrically opposed sides of the vertical arm 26 adjacent to its top. A second set of horizontally extending arms 34 and 36 are joined to the vertical arm 26 about midway along its height below the arms 30 and 32. It should be understood that in other embodiments of the invention only a single set of arms might be provided or three sets of arms might be provided.

Figure 11:
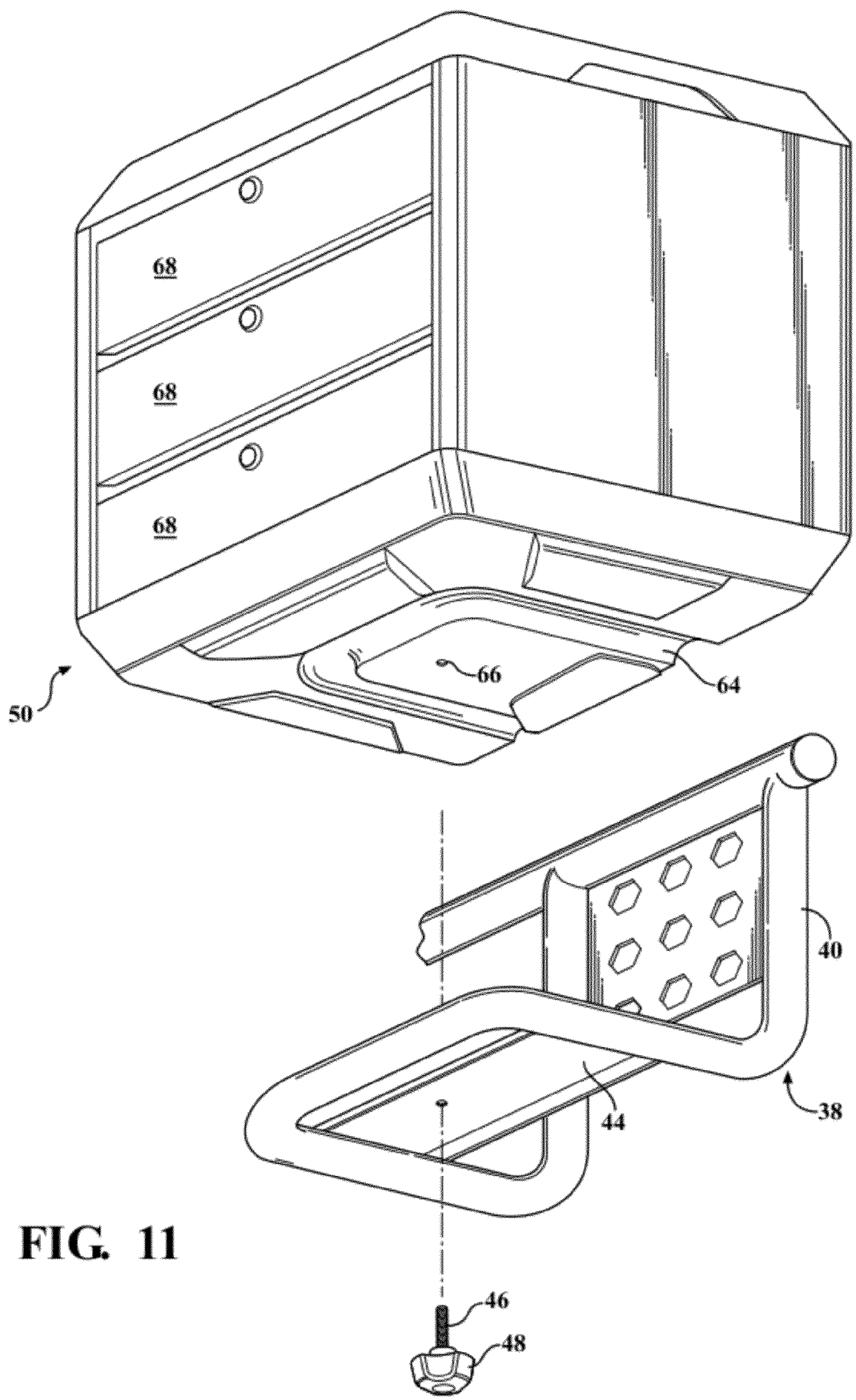
FIG. 11 is a perspective bottom view of one of the accessory cubes and a top view of one of the support platforms, illustrating their mating surfaces.

Each of the arms 30, 32, 34 and 36 support platforms, generally indicated at 38, from their undersides. The support platforms are all identical. Each support platform comprises a length of tubing 40, bent into an L-shaped platform with its free ends attached to spaced points on one of the horizontal rods 32-36. The tubing sections first extend downwardly from the rods and then are bent outwardly to form an L-shaped horizontal platform. Each platform includes a back section 42 and a flat platform support plate 44 which extends across the horizontal section with its top slightly below the height of the surrounding tubing. As illustrated in FIG. 11, each of the platform plates 44 has a central hole that allows a threaded fastener 46 with a knob end 48 to extend upwardly through the platform to engage a modular cube generally indicated at 50 in FIG. 11 in order to retain the modular cube on the support platform.

Figure 7:
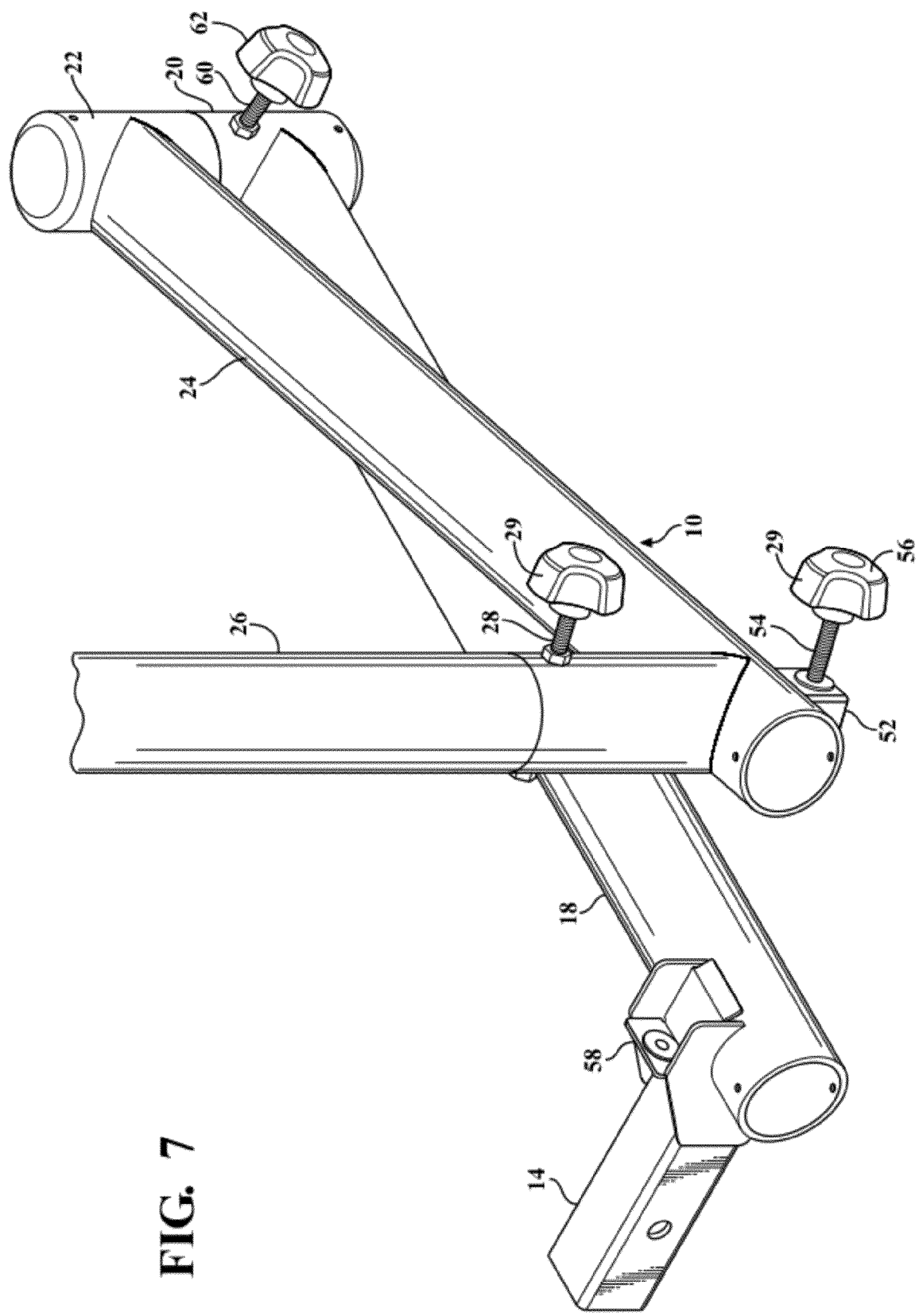
FIG. 7 is a detailed perspective view, partially broken away, of the swing arm of the rack and its lock.

The rack 10 further includes a section 52 attached to the bottom of the extending end of the arm 24, as illustrated in FIG. 7. A threaded fastener 54 with a knob end 56 extends through the hole in the section 52 to engage a threaded female member 58 formed on the first arm 18, adjacent to the male hitch member 14. When the fastener 54 is joined to the member 58, the second arm 24 is locked over the top of the first arm 18, for travel purposes or the like. Also illustrated in FIG. 7 is a threaded fastener 60 with a knob end 62 that extends through the pivotable joint 20 to lock the joint into position.

The modular carriers generally indicated at 50 are designed in a variety of forms, all having the same outer dimensions. As illustrated in FIG. 11, each module, generally indicated at 50, has a U-shaped recess 64 formed on its bottom. This recess is complementary to the shape of the horizontal sections of the tubes 40 which forms the platforms, so as to position the modules on the platforms. The module is then secured on the platform by passing a fastener 46 through the hole in the platform into a complementary threaded recess 66 formed in the center of the U-shaped recess 64. They may be screwed and unscrewed by hand using the knob 48.

Figure 8:
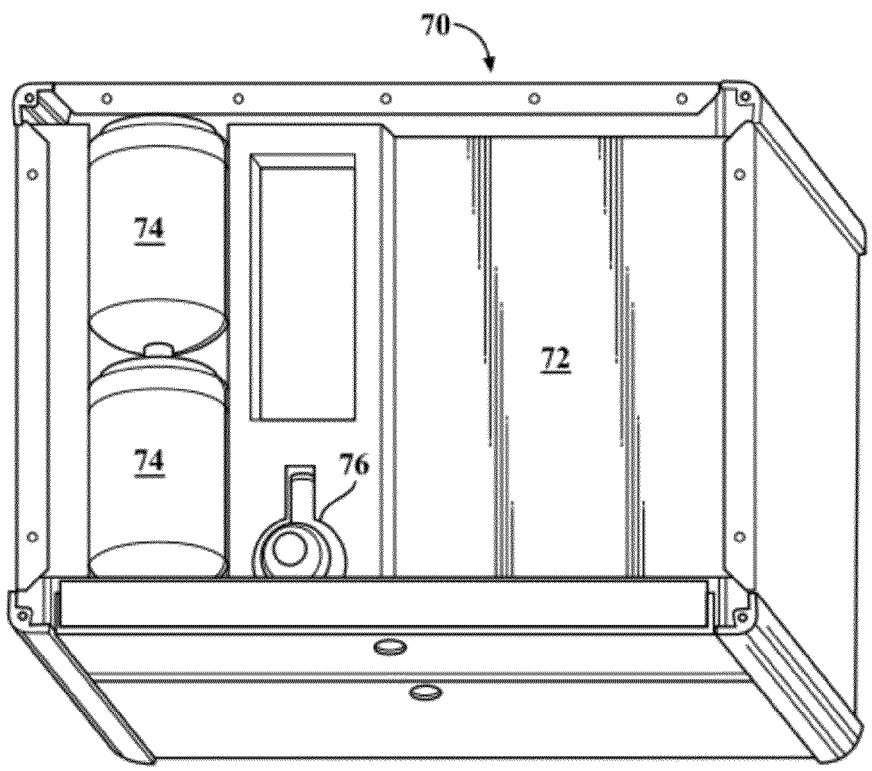
FIG. 8 is a top perspective view of an accessory cube containing a propane source and a large drawer for a gas grill.
Figure 9:
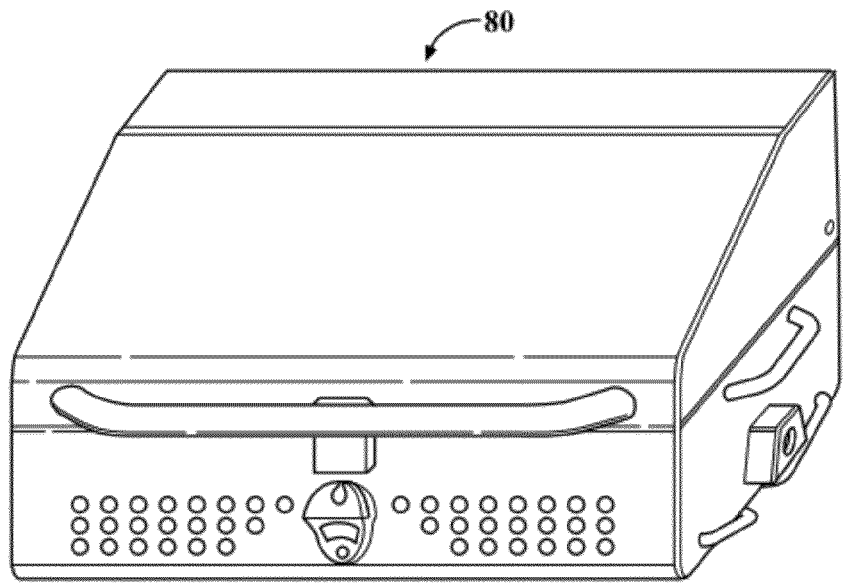
FIG. 9 is a perspective view of a gas grill which fits within the drawer in the module of FIG. 8.

The modules come in a variety of forms. The form illustrated in FIGS. 1-3 and 11, generally indicated at 50, contains several drawers 68 which may support miscellaneous equipment or useful tools and the like. The module 70, generally indicated in FIG. 8, comprises a grill assembly having liquid propane tanks 74 for heating a grill, and manual controls 76. The unit 80, generally indicated at 80 in FIG. 9, fits within one of the drawers of the module 70 and may be connected to the tanks 74.

Figure 10:
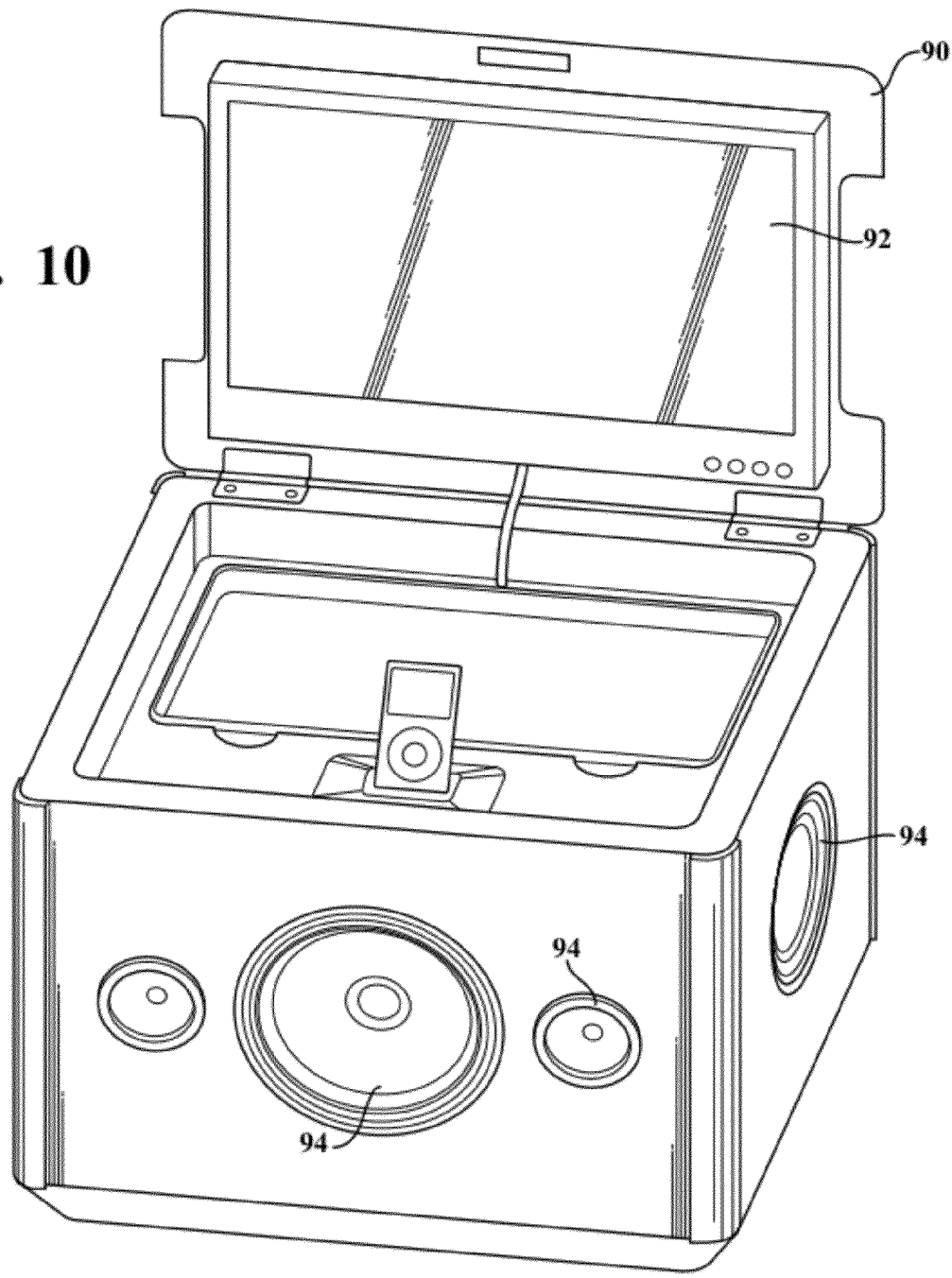

An entertainment cube is illustrated in FIG. 10. It has a top lid 90 which supports a television screen 92 so that when the lid 90 is in an open position the screen 92 is disposed in a substantially vertical position. The module includes a number of loudspeakers 94 and could include an audio player such as an MP3 player, a DVD player, a radio, or the like.

Figure 1:
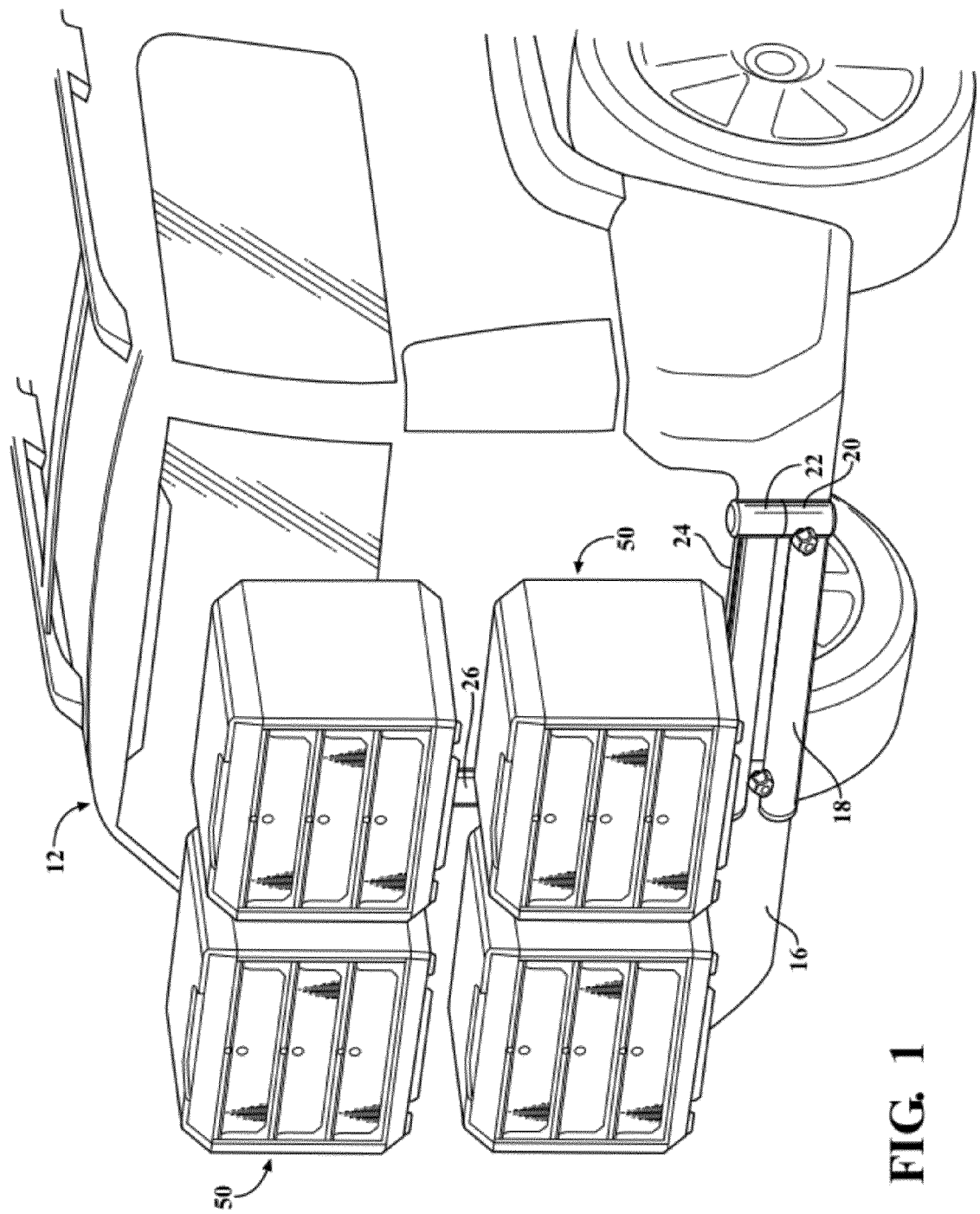
FIG. 1 is a perspective view from the rear of an SUV type motor vehicle with a preferred embodiment of the rack of the present invention attached to the vehicle by a hitch and with the swing arm closed so the modular accessory cubes extend behind the vehicle.
Figure 2:
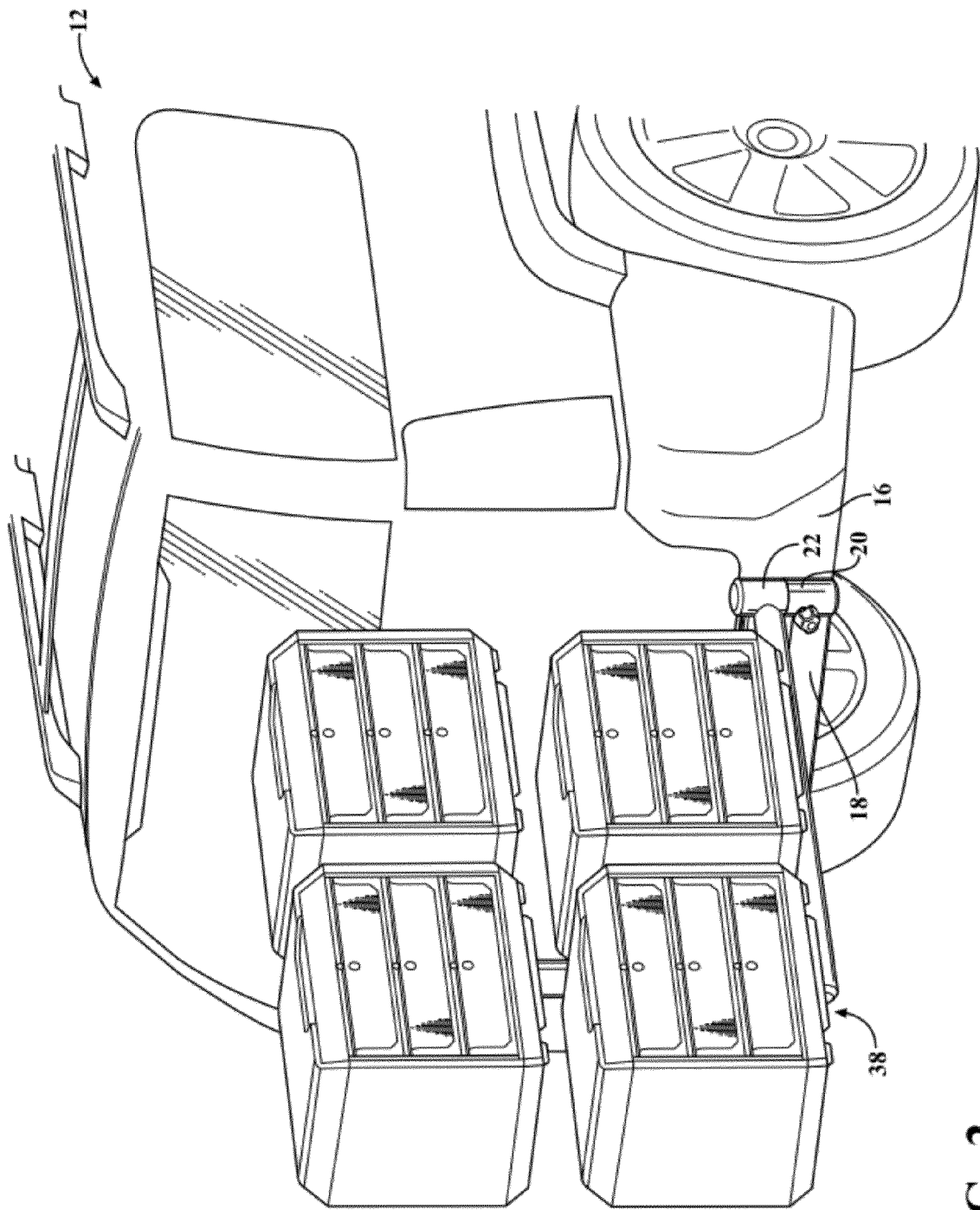
FIG. 2 is a perspective view similar to FIG. 1 with the swing arm open.
Figure 3:
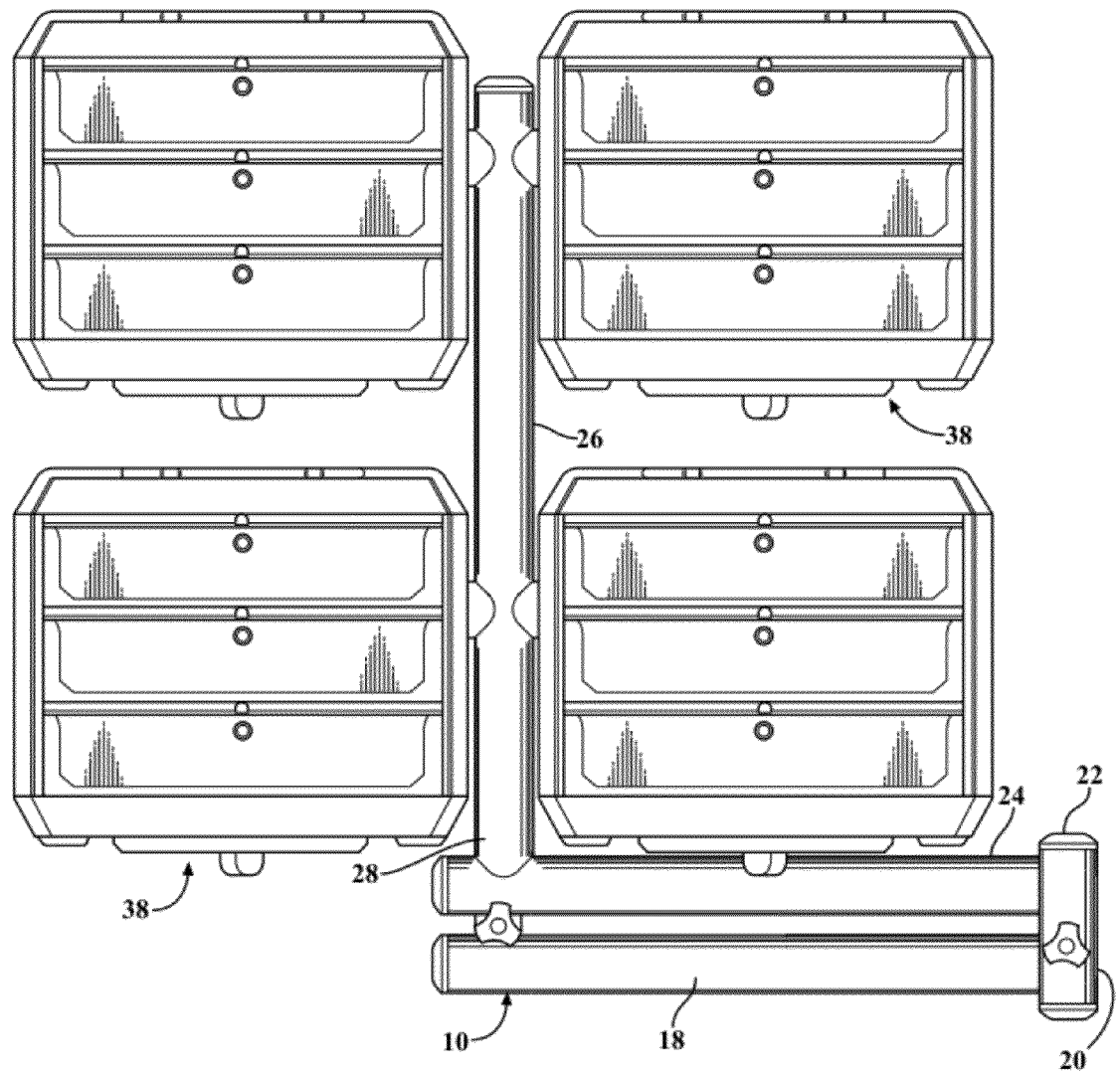
FIG. 3 is a front view of the preferred embodiment of the rack supporting four drawer type modular accessory cubes.

In use, the modules supported on the platforms could be carried against the back wall of vehicle 12 as illustrated in FIG. 1 and upon arriving at a destination could be swung outwardly as illustrated in FIG. 2. The modules could be chosen based on the desired outdoor activity and could be provided in a wide variety of forms, such as in insulated cooler which preferably has a top opening.

The invention claimed is:

1. A carrier for a motor vehicle comprising:
   a rack adapted to be releasably secured to the rear of the motor vehicle, said rack including a generally vertically extending elongated arm and a plurality of elongated rods each having one end joined to said arm at generally right angles so as to extend generally horizontally from said arm;
   a plurality of generally planar platforms, one attached to each of said plurality of rods at spaced locations relative to one another so that the platforms are aligned generally horizontally when the rack is secured to the vehicle; and
   a plurality of generally cubical modules, each adapted to be supported on one of the platforms and retained thereon by separable fasteners.

2. The carrier for a motor vehicle of claim 1, wherein certain of said generally cubical modules comprise containers for a plurality of drawers which are supported in the modules so as to move under manual force between a closed position wherein the drawers are within the confines of the module and an open position in which the drawers extend outwardly from the module.

3. The carrier for a motor vehicle of claim 1, wherein at least certain of said generally cubical modules comprise a support for liquid propane bottles and have a drawer for receiving a portable grill which may be removed from the door and connected to the propane sources for use.

4. The carrier for a motor vehicle of claim 1, in which the cubical modules include an entertainment module having a loudspeaker retained within its outer walls and having an electronic audio source within the cube connected to the loudspeaker so as to provide its output to the loudspeaker, the electronic audio source being one of a group consisting of MP3 players, DVD players, radios, and television sets.

5. The carrier for a motor vehicle of claim 1, wherein the rack is adapted to be releasably secured to the rear of a motor vehicle by a two part hitch mount, with a female member of the hitch mount secured to the rear of the vehicle along the longitudinal axis of the vehicle and a male member is adapted to be attached to the rack.

6. The carrier of claim 5, in which the rack is secured to the male hitch member by a pair of horizontally arrayed elongated arms joined together by a pivotable joint with the first of the two arms being fixed to the male hitch member at one end and at its end opposite fixed to the joint, and the second of the arms being joined to the rack at one end and at its end opposite to the pivotable joint so that the rack may swing out relative to the rear of a vehicle about said pivotable joint.

7. The carrier for a motor vehicle of claim 6, wherein said generally vertically extending elongated arm is connected to the end of the second elongated arm at the end opposite to the pivotable joint.

8. The carrier for a motor vehicle of claim 7, wherein each of said generally planar platforms comprises a U-shaped tube bent into an L-shaped configuration with the free ends of the tube affixed to spaced points on the bottom of one of the rods and projecting downward therefrom, so as to present a horizontal platform when the rack is secured to the vehicle.

9. The carrier for a motor vehicle of claim 8, wherein each of the cubical modules has a recess formed on its bottom side which overlies the tube section forming the horizontal platform so as to locate a cube on the platform.

10. A rack for retaining a plurality of modular accessory cubes at the rear of a motor vehicle having a longitudinal axis, comprising:
    a separable hitch comprising a female connector having a central axis, the female connector being secured to the rear of the vehicle with its central axis aligned with the longitudinal axis of the vehicle, and a male connector having a central axis adapted to be releasably secured to the female connector so that the central axis of the male connector projects rearwardly from the vehicle;
    a first elongated arm having a first end joined to the rearwardly projecting end of the male connector at a generally right angle so the first arm extends generally horizontally along the rear end of the vehicle;
    a second elongated arm having a first end connected to a second end of said first elongated arm at the top of a first pivotable joint having a projection upwardly from the first elongated arm so the second arm may swing in a plane above the first arm;
    a generally vertically extending third elongated arm joined to a second end of said second arm to project upwardly from the second arm;
    a plurality of elongated rods each having one end joined to said third arm at generally right angles so as to extend generally horizontally from said third arm; and
    a plurality of support platforms, one attached to each of said plurality of rods, to present generally horizontal mounting surfaces for said modular accessory cubes, the mounting surfaces extending away from said vehicle when said second arm is arrayed over the first arm, and moving rearwardly away from the vehicle when said second arm is swung rearwardly about said pivotable joint.

11. The rack of claim 10, further comprising lock members supported on the first and second arms to lock the second arm in a position above and parallel to the first arm.

12. The rack of claim 10, wherein the support platforms are formed with U-shaped tubular sections having their free ends connected to spaced points on the bottom of one of the rods, the U-shaped sections extending downwardly from the rods and then outwardly to form said generally horizontal mounting surface for said modular accessory cubes.

13. The rack of claim 10, wherein each of said modular accessory cubes has a recess on its lower side complementary to the configuration of the tubular mounting surface for positioning the modular cube on the mounting surface.

* * * * *